US008905907B2

(12) United States Patent
Pei

(10) Patent No.: US 8,905,907 B2
(45) Date of Patent: Dec. 9, 2014

(54) CUTTING DEVICE FOR CUTTING LENSES

(75) Inventor: Shao-Kai Pei, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 638 days.

(21) Appl. No.: 13/175,965

(22) Filed: Jul. 5, 2011

(65) Prior Publication Data

US 2012/0301237 A1 Nov. 29, 2012

(30) Foreign Application Priority Data

May 26, 2011 (TW) ................................ 100118525

(51) Int. Cl.

| | |
|---|---|
| ***B23Q 3/157*** | (2006.01) |
| ***B23C 1/06*** | (2006.01) |
| ***B28D 1/04*** | (2006.01) |

(52) U.S. Cl.

CPC ...................................... *B28D 1/041* (2013.01)
USPC ............................................. 483/55; 409/231

(58) Field of Classification Search

USPC ............ 483/54, 55, 56; 408/87–88, 101–102, 408/137–138; 279/128; 409/231–232, 202, 409/212
See application file for complete search history.

(56) References Cited

U.S. PATENT DOCUMENTS

| | | | | |
|---|---|---|---|---|
| 1,826,625 | A * | 10/1931 | Masters | 451/550 |
| 3,194,091 | A * | 7/1965 | Woodward | 76/108.1 |
| 4,761,877 | A * | 8/1988 | Rupp | 483/54 |
| 7,264,426 | B2 * | 9/2007 | Buttrick, Jr. | 408/1 R |
| 7,467,449 | B1 * | 12/2008 | Lee et al. | 29/26 A |

* cited by examiner

*Primary Examiner* — Daniel Howell
*Assistant Examiner* — Chwen-Wei Su
(74) *Attorney, Agent, or Firm* — Novak Druce Connolly Bove + Quigg LLP

(57) ABSTRACT

A cutting device includes a support base, a first slide module, a second slide module slidably connected to the first slide module, and a cutting module. The support base includes a support surface and a slide portion on the support surface. The first slide module is slidably positioned on the slide portion. The sliding direction of the second slide module is perpendicular to the sliding direction of the first slide module. The cutting module includes a fixed frame fixed on the second slide module, a driving device fixed on the fixed frame, and a cutter connected to the driving device. The driving device drives the cutter to rotate around a central axis of the cutter and move up and down along the central axis. The central axis is perpendicular to the support surface. The cutter includes a hollow cylindrical blade. An end surface of the blade faces the support surface.

9 Claims, 3 Drawing Sheets

CUTTING DEVICE FOR CUTTING LENSES

BACKGROUND

1. Technical Field

The present disclosure relates to a device for cutting a lens.

2. Description of Related Art

A number of round glass lenses are usually shaped by a grinding wheel. When shaping the round glasses, a number of square glasses are firstly bonded together to be a whole body by a UV curing adhesive. Then, the whole body is arranged on a centering fixture. Finally, the square glasses are ground into round glass lenses by the grinding wheel. After grinding, the adhesive should be removed from the round glass lenses to establish and guarantee the quality of the round glass lenses.

However, it is difficult to completely remove the UV curing adhesive from the round glass lenses. Some residual adhesive is usually left on the round glass lenses, and establishing the quality of the round glass becomes problematic.

Therefore, what is needed is a cutting device that can overcome the described limitations.

DETAILED DESCRIPTION

Embodiments will now be described in detail with reference to drawings.

Figure 1:
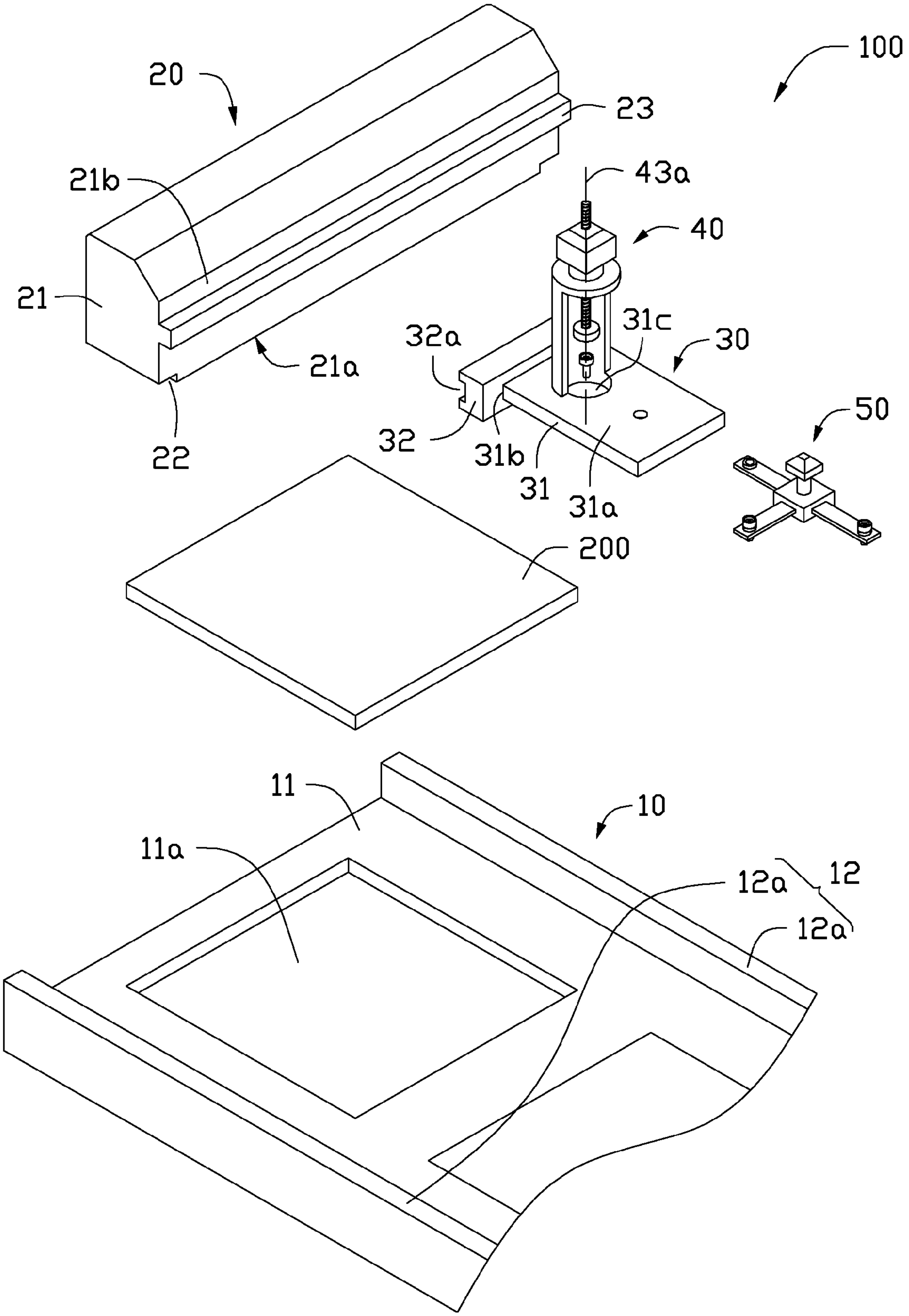
FIG. 1 is an isometric view of a cutting device according to an exemplary embodiment.

Referring to FIG. 1, a cutting device 100 for cutting and shaping a lens, in accordance with an exemplary embodiment, includes a support base 10, a first slide module 20, a second slide module 30, a cutting module 40, and a cutter replacement module 50.

The support base 10 includes a support surface 11 and a first slide portion 12 securely arranged on the support surface 11. In the present embodiment, the support base 10 is a rectangular structure. The support surface 11 defines a plurality of rectangular receiving recesses 11*a* along the length of the support surface 11. Each of the receiving recesses 11*a* is configured for receiving a glass substrate 200. The first slide portion 12 includes two slide rails 12*a* extending the length of the support base 10. The two slide rails 12*a* are located on the two sides of the receiving recesses 11*a* (i.e. the receiving recesses 11*a* are between the slide rails 12*a*).

The first slide module 20 rests slidably on the support base 10. The first slide module 20 includes a main body 21, two parallel second slide portions 22, and a third slide portion 23.

The main body 21 is a beam structure, and includes a bottom surface 21*a* and a lateral surface 21*b* perpendicular to the bottom surface 21*a*.

The two parallel second slide portions 22 are two slide grooves defined at the longitudinal ends of the bottom surface 21*a*. The two parallel second slide portions 22 respectively engage with the two slide rails 12*a*, such that the first slide module 20 can slide freely but precisely along the slide rails 12*a*. In alternative embodiments, the two slide rails 12*a* may be replaced by two parallel slide grooves. In such a case, the two parallel second slide portions 22 are replaced by two slide rails.

The third slide portion 23 is fixed on the lateral surface 21*b*, and is a slide rail extending along the length of the main body 21. The third slide portion 23 is perpendicular to the slide rails 12*a*.

The second slide module 30 is slidably disposed on the first slide module 20, and slides along the third slide portion 23, such that the slide direction of the second slide module 30 is perpendicular to the slide direction of the first slide module 20. The second slide module 30 includes a support portion 31, and a fourth slide portion 32.

The support portion 31 is a rectangular plate, and includes a top surface 31*a* and a lateral surface 31*b* perpendicular to the top surface 31*a*. A through hole 31*c* is defined in the top surface 31*a*.

The fourth slide portion 32 is fixed on the lateral surface 31*b*. The fourth slide portion 32 includes a slide groove 32*a* to engage with the third slide portion 23, such that the second slide module 30 can slide freely but precisely along the third slide portion 23. In other embodiments, the slide groove 32*a* may be replaced by a slide rail. In such case, the third slide portion 23 should be replaced by a slide groove.

Figure 2:
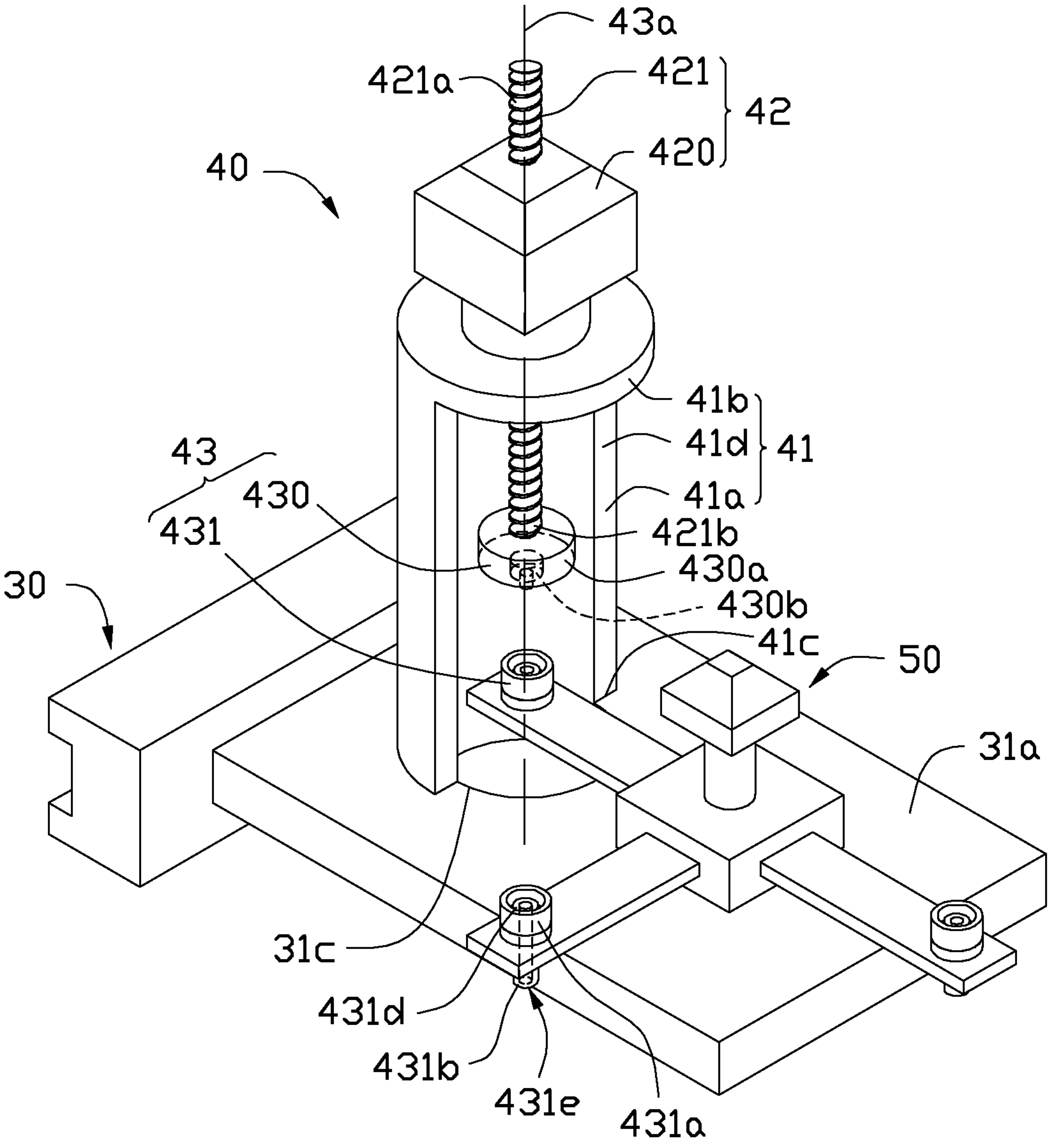
FIG. 2 is a view of a part of the cutting device of FIG. 1.
Figure 3:
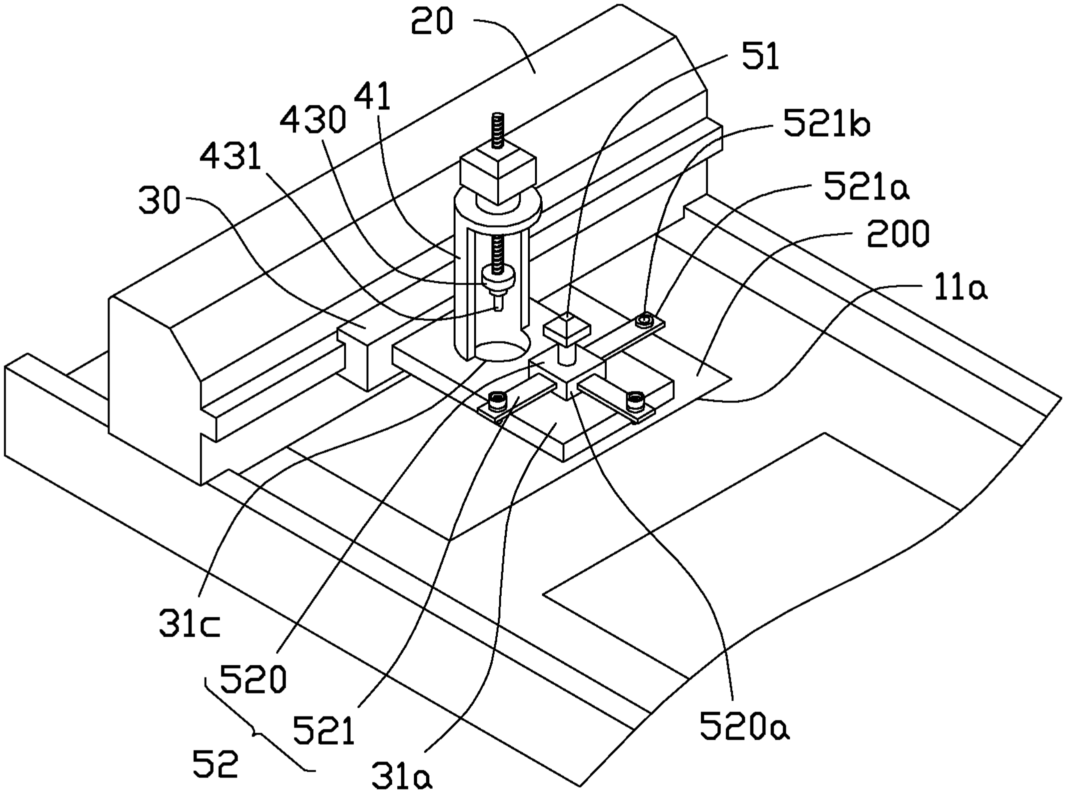
FIG. 3 is a view of the assembled cutting device of FIG. 1.

Referring also to FIGS. 2-3, the cutting module 40 is fixed on the top surface 31*a* of the second slide module 30. The cutting module 40 includes a fixed bracket 41, a driving device 42 and a cutter unit 43.

The fixed bracket 41 aligns with the through hole 31*c*, and is fixed on the top surface 31*a*. The fixed bracket 41 is a cylindrical structure, and includes a support body 41*a* and a top plate 41*b*.

The support body 41*a* is a semi-cylindrical sidewall, and includes a first end 41*c* and a second end 41*d* opposite to the first end 41*c*. The first end 41*c* surrounds the through hole 31*c*, and is fixed on the top surface 31*a*. The top plate 41*b* is fixed on the second end 41*d*. In other embodiments, the support body 41*a* may be a prismatic structure, a linking structure, etc.

The driving device 42 is fixed on the fixed bracket 41. The driving device 42 is configured for driving the cutter unit 43 to rotate around the axis 43*a* perpendicular to the support surface 11, and to move up and down along the axis 43*a*. The driving device 42 includes a first motor 420 and a screw rod 421.

The first motor 420 is fixed on the top plate 41*b*. In the present embodiment, the first motor 420 is a stepping motor.

The screw rod 421 includes a third end 421*a* and a fourth end 421*b* opposite to the third end 421*a*. The third end 421*a* is connected to the first motor 420. The fourth end 421*b* passes through the top plate 41*b*, and is coaxial with the through hole 31*c*. In the present embodiment, the central axis of the screw rod 421 is coaxial with the rotation axis 43*a*. The first motor 420 rotates the screw rod 421 around the rotation axis 43*a*, and so moves the screw rod 421 up and down the axis 43*a*. In other embodiments, the driving device 42 may includes two stepping motors, one of which drives the screw rod 421 to simply rotate around the rotation axis 43*a*, and another of which drives the up and down movement of the screw rod 421.

The cutter unit 43 includes a grip member 430 and three cutters 431.

The grip member 430 includes a grip main body 430*a* and a first absorbing portion 430*b*. The grip main body 430*a* is fixed on the fourth end 421*b* of the screw rod 421. In the present embodiment, the first absorbing portion 430*b* is an electromagnet.

Each of the cutters 431 includes a second absorbing portion 431*a* and a blade 431*b* fixed on the second absorbing portion 431*a*. The diameter of the second absorbing portion 431*a* is larger than that of the blade 431*b*, such that a stepped portion is formed between the second absorbing portion 431*a* and the blade 431*b*.

The second absorbing portion 431*a* and the first absorbing portion 430*b* attract each other magnetically. An end portion of the second absorbing portion 431*a*, which is far away from the blade 431*b*, defines a recess 431*d* to engage with the first absorbing portion 430*b*. In the present embodiment, the second absorbing portion 431*a* is made of ferromagnetic material, for example, iron, nickel, cobalt, etc. In other embodiments, the second absorbing portion 431*a* may be a permanent magnet.

The blade 431*b* is a hollow cylindrical blade. An end surface 431*e* of the blade 431*b* faces the support surface 11. The internal diameter of the blade 431*b* determines the diameter of the glass after being cut. In the present embodiment, the blade 431*b* is made of hard alloy coated with an aluminum titanium nitride ceramics film. In other embodiments, the blade 431*b* may be formed of a plurality of diamond particles, or of any other material of extreme hardness.

The cutter replacement module 50 is fixed on the second slide module 30. The cutter replacement module 50 includes a second motor 51 and a main body 52.

The second motor 51 is fixed on the top surface 31*a* for driving the main body 52 to rotate.

The main body 52 is rotationally connected to the second motor 51, such that the second motor 51 can drive the main body 52 to rotate. The main body 52 includes a connecting portion 520 and three support branches 521. The connecting portion 520 is connected to the second motor 51. In the present embodiment, the connecting portion 520 is a cubic structure.

The three support branches 521 are each fixed on a sidewall of the connecting portion 520. A distal end 521*a* of each support branch 521, which is far away from the connecting portion 520, defines a cutter receiving hole 521*b*. In the present embodiment, the three cutter receiving holes 521*b* may receive three cutters of different diameters, respectively. The blade 431*b* passes through the cutter receiving hole 521*b*. The second absorbing portion 431*a* rests on the support branch 521.

Before cutting a glass, the glass substrate 200 is disposed in the receiving recess 11*a*, and a suitable cutter 431 is selected based on the desired dimension of the finished glass lens. When changing the cutter 431, the support branch 521 with the correct cutter 431 is firstly rotated until the support branch 521 with the correct cutter 431 is under the grip member 430. The central axis of the correct cutter 431 is coaxial with the rotation axis 43*a*. Then, the first absorbing portion 430*b* is inserted into the recess 431*d* of the second absorbing portion 431*a* and is powered to attract the second absorbing portion 431*a*. The first motor 420 drives the screw rod 421 to move up, such that the blade 431*b* of the correct cutter 431 moves out of the cutter receiving hole 521*b* and separates from the support branch 521. The support branch 521 is rotated out of the fixed frame 41. A cutting position is determined by adjusting the relative positions of the first slide module 20 and the second slide module 30, and then the correct cutter 431 is moved down and rotated by the screw rod 421, such that a glass lens with the desired dimensions is cut by the hollow cylindrical blade 431*b* of the correct cutter 431 from the glass substrate 200. A plurality of the glass lenses can by cut from the glass substrate 200 by changing the position of the cutter 431. The first slide module 20 and the second slide module 30 can be controlled by machine or computer to move, or manually by hand.

The cutting device 100 uses the hollow cylindrical blade 431*b* to cut a circular glass lens from the glass substrate 200. The need for any adhesive is obviated, thus the glass lens can have no adhesive, or residue of adhesive, on its surface.

While certain embodiments have been described and exemplified above, various other embodiments will be apparent from the foregoing disclosure to those skilled in the art. The disclosure is not limited to the particular embodiments described and exemplified but is capable of considerable variation and modification without departure from the scope and spirit of the appended claims.

What is claimed is:

1. A cutting device for cutting lenses, comprising:

a support base, the support base comprising a support surface and a slide portion on the support surface;

a first slide module, the first slide module being slidely positioned on the slide portion;

a second slide module, the second slide module being slidely positioned on the first slide module, the sliding direction of the second slide module being perpendicular to the sliding direction of the first slide module, and a cutting module, the cutting module comprising a fixed bracket, a driving device, and a cutter, the fixed bracket comprising a support body and a top plate, the support body comprising a first end and a second end opposite to the first end, the first end being positioned on the second slide module, and the top plate being fixed on the second end, the driving device comprising a first motor and a screw rod, the first motor being fixed on the top plate, the screw rod passing through the top plate, one end of the screw rod being connected to the first motor, and another end of the screw rod being connected to the cutter, the first motor capable of driving the screw rod to rotate around the central axis of the cutter, and to move up and down along the central axis of the cutter, the central axis of the cutter being perpendicular to the support surface, the cutter comprising a blade, the blade being a hollow cylindrical blade, and an end surface of the blade facing the support surface.

2. The cutting device of claim 1, wherein the support surface defines a plurality of square receiving recesses.

3. The cutting device of claim 1, wherein the support body is a semi-cylindrical sidewall.

4. The cutting device of claim 3, wherein the second slide module defines a through hole, the through hole is partially surrounded by the support body.

5. The cutting device of claim 4, wherein the screw rod is aligned with the through hole.

6. The cutting device of claim 5, further comprising a grip member, the grip member comprising a grip main body and a first absorbing portion, the grip main body being fixed on one end of the screw rod, the first absorbing portion being an electromagnet, the cutter comprising a second absorbing portion, the first absorbing portion and the second absorbing portion attracting each other.

7. The cutting device of claim 6, wherein the second absorbing portion defines a recess receiving the first absorbing portion.

8. The cutting device of claim 6, wherein the second absorbing portion is made of ferromagnetic material.

9. The cutting device of claim 1, further comprising a cutter replacement module, the cutter replacement module comprising a second motor and a main body, the second motor being positioned on the main body, the main body being rotationally positioned on the second slide module, the main body comprising a connecting portion and three support branches, the connecting portion being rotationally connected to the second motor, the three support branches extending from the connecting portion along three different directions, a distal end of each support branch defining a cutter receiving hole.

* * * * *